US009451584B1

(12) United States Patent
Cosenza et al.

(10) Patent No.: US 9,451,584 B1
(45) Date of Patent: Sep. 20, 2016

(54) SYSTEM AND METHOD FOR SELECTION OF NOTIFICATION TECHNIQUES IN AN ELECTRONIC DEVICE

(71) Applicant: Google Inc., Mountain View, CA (US)

(72) Inventors: Roberto Cosenza, London (GB); Luca Zanolin, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/139,166

(22) Filed: Dec. 23, 2013

Related U.S. Application Data

(63) Continuation of application No. 13/706,562, filed on Dec. 6, 2012, now Pat. No. 8,615,221.

(51) Int. Cl.
H04M 3/42 (2006.01)
H04W 68/00 (2009.01)

(52) U.S. Cl.
CPC ................... *H04W 68/005* (2013.01)

(58) Field of Classification Search
CPC ............. H04L 29/08108; H04M 2207/18
USPC ........................... 455/414.1; 370/338
See application file for complete search history.

(56) References Cited

U.S. PATENT DOCUMENTS

| | | |
|---|---|---|
| 4,975,962 A | 12/1990 | Oka |
| 5,373,330 A | 12/1994 | Levine |
| 5,765,130 A | 6/1998 | Nguyen |
| 6,249,759 B1 | 6/2001 | Oda |
| 6,317,607 B1 * | 11/2001 | Tomcik et al. ............ 455/552.1 |
| 6,330,539 B1 | 12/2001 | Takayama et al. |
| 6,393,272 B1 | 5/2002 | Cannon et al. |
| 6,882,973 B1 | 4/2005 | Pickering |
| 6,980,993 B2 | 12/2005 | Horvitz et al. |
| 7,024,353 B2 | 4/2006 | Ramabadran |
| 7,069,221 B2 | 6/2006 | Crane et al. |
| 7,162,421 B1 | 1/2007 | Zeppenfeld et al. |
| 7,194,409 B2 | 3/2007 | Balentine et al. |
| 7,243,130 B2 | 7/2007 | Horvitz et al. |
| 7,283,808 B2 | 10/2007 | Castell et al. |
| 7,287,056 B2 | 10/2007 | Loveland et al. |
| 7,392,188 B2 | 6/2008 | Junkawitsch et al. |
| 7,437,286 B2 | 10/2008 | Pi et al. |

(Continued)

FOREIGN PATENT DOCUMENTS

EP     2 781 883 A2     9/2014

OTHER PUBLICATIONS

"One of Android's all-time most annoying issues still exists: notification sounds interrupt music playback. Please star this issue to encourage Google to fix it", REDDIT [online]. Posted Apr. 2, 2013. Retrieved from the Internet: <http://www.reddit.com/r/Android/comments/1bi32i1> 15 pgs.

(Continued)

*Primary Examiner* — Marcos Batista
(74) *Attorney, Agent, or Firm* — Shumaker & Sieffert, P.A.

(57) ABSTRACT

The present disclosure includes a system and method for delaying, suppressing, or canceling the output of notifications in an electronic device. Notifications may be delayed, suppressed, or canceled based on the urgency of the notification, whether an application is actively executing and controlling certain aspects of the output device, whether an application actively executing and controlling certain aspects of the output device can be interrupted, and/or the operating environment of the electronic device.

18 Claims, 4 Drawing Sheets

(56) References Cited

U.S. PATENT DOCUMENTS

| | | | |
|---|---|---|---|
| 7,443,967 B1* | 10/2008 | Silver | 379/106.09 |
| 7,606,536 B1 | 10/2009 | Koenck et al. | |
| 7,735,108 B2* | 6/2010 | FitzGerald | H04N 5/76 379/218.01 |
| 7,769,154 B1 | 8/2010 | Craft et al. | |
| 7,865,904 B2 | 1/2011 | McKee et al. | |
| 7,975,015 B2 | 7/2011 | Horvitz et al. | |
| 8,023,661 B2 | 9/2011 | Brooks et al. | |
| 8,254,970 B1* | 8/2012 | Oshinsky | H04W 88/02 455/458 |
| 8,452,266 B2 | 5/2013 | Chiu et al. | |
| 8,619,965 B1 | 12/2013 | Figa et al. | |
| 8,682,304 B2 | 3/2014 | Doulton | |
| 8,731,912 B1 | 5/2014 | Tickner et al. | |
| 2001/0042136 A1 | 11/2001 | Guedalia et al. | |
| 2002/0054117 A1 | 5/2002 | van Dantzich et al. | |
| 2002/0087649 A1 | 7/2002 | Horvitz | |
| 2003/0039338 A1 | 2/2003 | Erb et al. | |
| 2003/0055768 A1 | 3/2003 | Anaya et al. | |
| 2004/0030753 A1 | 2/2004 | Horvitz | |
| 2004/0254998 A1* | 12/2004 | Horvitz | 709/206 |
| 2004/0267525 A1 | 12/2004 | Lee et al. | |
| 2005/0069119 A1* | 3/2005 | Erhart et al. | 379/215.01 |
| 2006/0123360 A1 | 6/2006 | Anwar et al. | |
| 2006/0223547 A1 | 10/2006 | Chin et al. | |
| 2006/0262719 A1 | 11/2006 | Cao et al. | |
| 2006/0274831 A1* | 12/2006 | Fernandez | H04N 19/61 375/240.12 |
| 2006/0286993 A1 | 12/2006 | Xie et al. | |
| 2007/0066283 A1* | 3/2007 | Haar et al. | 455/412.2 |
| 2007/0086365 A1 | 4/2007 | Chen et al. | |
| 2007/0127704 A1 | 6/2007 | Marti et al. | |
| 2007/0155326 A1* | 7/2007 | Lin et al. | 455/41.2 |
| 2007/0243893 A1 | 10/2007 | Takahashi et al. | |
| 2008/0082510 A1* | 4/2008 | Wang et al. | 707/3 |
| 2008/0114859 A1 | 5/2008 | Orzen | |
| 2009/0238386 A1 | 9/2009 | Usher et al. | |
| 2009/0240497 A1 | 9/2009 | Usher et al. | |
| 2010/0058231 A1 | 3/2010 | Duarte et al. | |
| 2010/0280749 A1 | 11/2010 | Furumoto et al. | |
| 2010/0280827 A1 | 11/2010 | Mukerjee et al. | |
| 2011/0102172 A1 | 5/2011 | Chiu et al. | |
| 2011/0154391 A1 | 6/2011 | Velazquez et al. | |
| 2011/0167382 A1 | 7/2011 | van Os | |
| 2011/0167383 A1 | 7/2011 | Schuller et al. | |
| 2011/0169632 A1* | 7/2011 | Walker et al. | 340/539.13 |
| 2011/0282658 A1 | 11/2011 | Wang et al. | |
| 2011/0298614 A1 | 12/2011 | Bells | |
| 2012/0028670 A1 | 2/2012 | Lim | |
| 2012/0108293 A1* | 5/2012 | Law et al. | 455/557 |
| 2012/0163630 A1 | 6/2012 | Yano et al. | |
| 2012/0214457 A1* | 8/2012 | Iaccarino | G01C 21/26 455/417 |
| 2012/0215537 A1 | 8/2012 | Igarashi | |
| 2012/0311045 A1 | 12/2012 | Sylvain | |
| 2013/0021950 A1 | 1/2013 | Chen et al. | |
| 2013/0029695 A1 | 1/2013 | Rychlik | |
| 2013/0145303 A1 | 6/2013 | Prakash et al. | |
| 2013/0160049 A1 | 6/2013 | Yamauchi | |

OTHER PUBLICATIONS

Basel qabouq, "how do i stop notifications from ringing while im on a phone call on the iphone 4s", Apple Support Communities [online]. Posted Feb. 19, 2012. Retrieved from the Internet: <https://discussions.apple.com/thread/3747787?tstart=0> 3 pgs.

"Delay Notifier—Android Apps on Google Play", piyota [online]. May 21, 2012. Retrieved from the Internet: <https://play.google.com/store/apps/details?id=jp.gr.java_conf.piyota.delaynotifier&hl=en> 2 pgs.

"iPod touch, for iOS 6.1 Software", Apple [User Guide]. Jun. 2013. 138 pgs.

"Pushover—Android Apps on Google Play", Superblock, LLC [online]. Aug. 28, 2013. Retrieved from the Internet: <https://play.google.com/store/apps/details?id=net.superblock.pushover&hl=en> 2 pgs.

Wilson et al., "Reducing Interruption Cost Using Slow-Growth Notifications", MIT Computer Science and Artificial Intelligence Lab [online]. First Accessed on: Sep. 5, 2013. Retrieved from the Internet: <http://groups.csail.mit.edu/uid/projects/slowgrowth/slow-growth-technote.pdf> 4 pgs.

Cassidyg, "Text messages received interrupt other activities", Verizon Wireless [online]. Posted Jun. 4, 2012. Retrieved from the Internet: <https://community.verizonwireless.com/thread/774750> 1 pg.

Iqbal et al., "Effects of Intelligent Notification Management on User and Their Tasks", CHI 2008. Apr. 5-10, 2008, 10 pgs.

Prosecution History from U.S. Appl. No. 13/706,562, dated Feb. 25, 2013 through Nov. 5, 2013, 42 pgs.

Prosecution History from U.S. Appl. No. 14/150,391, dated Feb. 27, 2014 through Jan. 22, 2015, 53 pgs.

* cited by examiner

SYSTEM AND METHOD FOR SELECTION OF NOTIFICATION TECHNIQUES IN AN ELECTRONIC DEVICE

CROSS REFERENCE TO RELATED APPLICATIONS

The application is a continuation of U.S. patent application Ser. No. 13/706,562, filed on Dec. 6, 2012, which is hereby incorporated by reference herein in its entirety.

BACKGROUND

Electronic devices, such as mobile communications devices, output notifications to indicate arrival of incoming electronic communications. These notifications may indicate, for example, arrival of an incoming text message or Email, a request to establish a telephone call, a news update from an information service, an advertisement, and the like. Conventional electronic devices typically support at least one of method or technique to output the notification to the user. Examples of such techniques include visual, aural, and tactile (e.g., haptic technology) output. Thus, a notification indicating the arrival of an incoming text message may generate output of an icon to a display, a beep or other sound to a speaker, and/or a vibration though a haptic system of the electronic device.

Often, if the user of an electronic device is in a situation or location where it is undesirable to receive output of a notification by a certain output technique, the user must manually adjust or disable the output mechanism. For example, when the user of an electronic device enters a library or an movie theater aural output may not be desired or appropriate. Conventional electronic devices require the user to manually mute or disable the speakers. Additionally, many electronic devices support audio/video media playback. Thus, another situation that frequently occurs is reception of an incoming communication while executing media playback—such as playing music or displaying a movie—on the electronic device. In such a situation, it may be undesirable to interrupt the media playback in order to output a notification of the incoming electronic communication.

Consequently, there is a need for a system and method for intelligent selection of notification techniques in an electronic device based on various factors, including the urgency or importance of the incoming communication and the media or application currently executing on the electronic device. Additionally, there is a need for a system and method to delay one or more notification techniques based on the stated factors.

SUMMARY

The present disclosure includes a method performed by an electronic device, the method comprising receiving a notification of an incoming electronic communication; determining that an output device included in the electronic device is unavailable to output the notification; identifying an application actively executing and controlling the output device; determining an unavailability period indicating duration of time the output device is unavailable to output the notification; determining urgency of the notification; outputting the notification to the output device when the notification is urgent; and delaying output of the notification to the output device for the unavailability period when the notification is not urgent.

Outputting the notification to the output device may comprise outputting at least two of aural output, visual output, and tactile output of the notification to the output device. Delaying output of the notification to the output device may comprise: delaying aural output of the notification to the output device; and outputting one of visual output and tactile output of the notification to the output device in real-time.

In an embodiment, the method further comprises: determining, based on the unavailability period, whether the application can be interrupted and relinquish control of the output device by: comparing the unavailability period to a threshold; determining, when the unavailability period is no more than the threshold, that the application cannot be interrupted; and determining, when the unavailability period is greater than the threshold, that the application can be interrupted. This embodiment may further comprise outputting, when the application can be interrupted, the notification to the output device; outputting, when the application cannot be interrupted and the notification is urgent, the notification to the output device; and delaying, when the application cannot be interrupted and the notification is not urgent, output of the notification to the output device for the unavailability period. The threshold may be determined by at least one of a user of the electronic device, the application, and an operating environment of the electronic device.

Determining the unavailability period indicating duration of time the output device is unavailable to output the notification may comprise: calculating, when the application is executing media of finite duration, a time remaining until the media completes execution and assigning the time remaining to the unavailability period; and estimating, when the application is not executing media of finite duration, an amount of time the application will control the output device and assigning the estimated amount of time to the unavailability period. Estimating the amount of time the application will control the output device may comprise analyzing historical data of the application. In some embodiments, the application is a telephony application and analyzing historical data of the telephony application includes analyzing a call log.

Another embodiment describes an electronic device comprising: a transceiver receiving a notification of an incoming electronic communication; an output device configured to output aural, visual, and tactile output; a notifications manager determining the output device is unavailable to output the notification, wherein the electronic device: identifies an application actively executing and controlling the output device, determines an unavailability period indicating duration of time the output device is unavailable to output the notification, and determines, based on the unavailability period, whether the application can be interrupted and relinquish control of the output device.

The electronic device may determine urgency of the notification; output, when the notification is urgent, the notification to the output device; and delay, when the notification is not urgent, aural output of the notification to the output device for the unavailability period and outputs visual output of the notification to the output device in real-time.

The unavailability period may be determined by: calculating, when the application is executing media of finite duration, a time remaining until the media completes execution and assigning the time remaining to the unavailability period; and estimating, when the application is not executing media of finite duration, an amount of time the application will control the output device and assigning the estimated amount of time to the unavailability period. Estimating the amount of time the application will control the output device may comprise analyzing historical data of the application.

The electronic device may comprise at least one sensor sensing an operating environment of the electronic device. Determining whether the application can be interrupted and relinquish control of the output device may comprise comparing the unavailability period to a threshold, the threshold adjusted by the operating environment.

Another embodiment describes an electronic device comprising: an operating system supporting one or more applications; a transceiver receiving an electronic communication for the one or more applications; an output device for announcing receipt of the electronic communication to a user of the electronic device; two or more tasks executed by any of the applications and the operating system, where one of the tasks is controlling the output device when the electronic communication is received; and a notifications manager cooperating with the operating system to manage the availability of the output device to any task executed by any of the applications and the operating system, including (1) determining a time period the output device will continue to be controlled by the task, and (2) deciding, based on the time period, whether the control of the output device by the task can be interrupted and control given another task for announcing receipt of the electronic communication.

Determining the time period may comprise: calculating, when the application is executing a task of known duration, a time remaining until the task of known duration completes execution and assigning the time remaining to the time period; and estimating, when the application is executing a task of unknown duration, an amount of time the task of unknown duration will control the output device and assigning the estimated amount of time to the time period.

Receipt of the electronic communication may be announced in real-time by at least two of aural output, visual output, and tactile output by the output device when the task can be interrupted, and receipt of the electronic communication may be announced in real-time by at least one of visual output and tactile output by the output device, and after the time period by aural output by the output device when the task cannot be interrupted.

These and other aspects of the disclosure are described herein.

DETAILED DESCRIPTION OF EXAMPLE EMBODIMENTS

Figure 1:
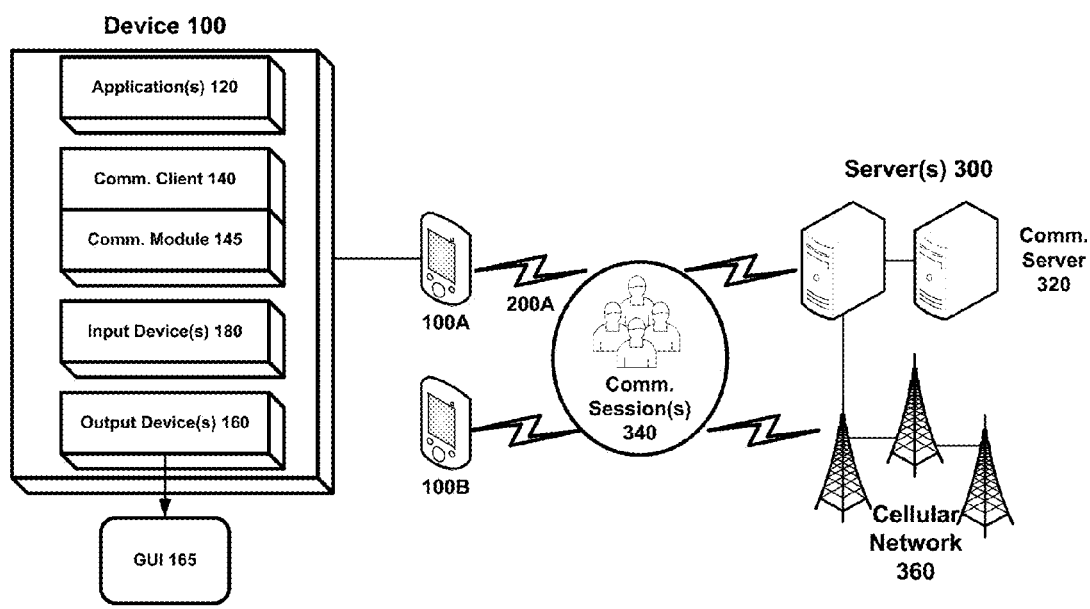
FIG. 1 is a block diagram of an example system supporting a communications environment, including a plurality of electronic devices interacting through a common communications session.

Example embodiments describe an electronic device that outputs a notification to indicate reception of a new incoming electronic communication. The electronic device may support aural, visual, and/or tactile (e.g., haptic technology) techniques to output notifications. One or more of the techniques to output notifications may be delayed in the electronic device based on the importance or urgency of the notification and the application or media that the electronic device is executing.

In an example embodiment, the electronic device is a mobile communications device that supports transmission and reception of electronic communications—e.g., telephony, text messaging, Email, videoconferencing—including multimedia communications. Examples of a mobile communications device include, but are not limited to, a mobile telephone, a mobile computer, a tablet computer, a "smartphone", and a personal data assistant (PDA). Notification of a new incoming electronic communication may be presented to the user of the mobile communications device by one or more output mechanisms. In this embodiment, the mobile communications device includes an output device that supports aural, and/or visual, and/or tactile output techniques. Thus, the reception of an incoming Email message may trigger the mobile communications device to generate a notification in the form of an icon or short message output to a display and/or a beep or other audible sound output to a speaker. As another example, reception of a news alert from a remote server hosted by an information service may trigger audio output to a speaker and/or a vibration through the device's tactile output system to notify the user of the news alert.

In this embodiment, a user of the mobile communications device may manually disable one or more of the output mechanisms based on the user's preference. For example, aural notifications may be distracting or inappropriate during a business meeting. The user of the mobile communications device can manipulate an input unit to manually—e.g., through a graphical user interface—mute, silence, or otherwise disable the aural output of the mobile communications device during the meeting.

Additionally, the mobile communications device may support intelligent output of notifications and automatically modify the behavior of the mobile communications device—e.g., the output of notifications—without requiring manual manipulation by the user. In this embodiment, the mobile communications device includes a notifications manager. The notifications manager can intelligently and automatically select one or more mechanisms for outputting notifications without requiring direct user input. Further, the notifications manager can delay the output of notifications, which would otherwise be output in real-time, i.e., without intentional delay after reception of an incoming electronic communication. Thus, when the mobile communications device of this embodiment receives an incoming electronic communication, such as an incoming text message, the notifications manager determines the appropriate mechanism(s) and timing for outputting the notification.

Factors considered by the notifications manager for intelligently and automatically selecting the appropriate mechanism(s) and timing include, but are not limited to, the importance or urgency of the notification and the application or media that the device is executing. The operating environment of the mobile communications device may also be considered. These factors may be considered alone or in combination.

The importance or urgency associated with a notification may be determined by gathering and analyzing data regarding the source, context, and the like of an incoming electronic communication. The data can be gathered from local sources (e.g., from applications and memory residing on/in the mobile communications device) or from remote destinations (e.g., by accessing a server residing at a remote location). Local applications that may provide insight into the source of the incoming electronic communication include, but are not limited to, a contact list, a call/message log, and a calendar application, all of which may be included in the mobile communications device of this embodiment. For example, upon reception of an incoming electronic communication, the notifications manager can access a contact list to determine if the source of the message—identified by an Email address, telephone number, screen name, internet protocol (IP) address, etc.—is a known contact. The contact list may also indicate a relationship status, such as "spouse," "boss," "friend," "family," etc. Similarly, the notifications manager can access a call/message log to analyze the frequency, duration, word count, and/or other factors of past communications. In this embodiment, the notifications manager may also gather and analyze information from remote destinations. For example, the notifications manager may access a social network to determine if a relationship exists between the user of the mobile communications device and the source of the message. As yet another example, the notifications manager can access a call/message log maintained on a remote server by the service provider, which may provide a more detailed history of communication than one stored locally on the mobile communications device.

Regarding the context of an incoming electronic communication, the notifications manager may consider factors such as the time, date, location and time zone, and subject matter of the communication. For example, the notifications manager can access a clock on the mobile communications device to determine whether the communication is received at night, during regular business hours, etc. As another example, the notifications manager can access a Global Positioning System (GPS) receiver to determine the location and/or time zone the mobile communication device currently resides in, and thereafter adjust output of a notification to reflect the location and/or time zone. In some embodiments, the notifications manager can access a calendar application residing on the mobile communications device to determine, for example, whether the communication is received on a weeknight, on a weekend, on the user's birthday, during a business meeting, etc. Furthermore, the notifications manager may be able to analyze the subject matter, e.g., key words, subject line of an Email, indication that the message is urgent, etc., of the communication. The factors and applications enumerated above for analyzing the urgency of an incoming electronic communication are not intended to be an exhaustive list and other factors known to those skilled in the art may additionally or alternatively be considered.

In this embodiment, the mobile communications device supports various applications, including applications that execute one or more media files (e.g., digital audio and video files) and/or one or more other tasks. An executing application may occupy and use one or more of the output mechanisms of the mobile communications device. For example, a media player executing an audio file, e.g., a song, may occupy the device's speaker(s). As another example, a media player executing a video file, e.g., a movie, may occupy the device's speaker(s) and display. As yet another example, an executing gaming application may occupy and use the device's speaker(s), display, and tactile output. In some situations, interruption of an application and/or media file in order to output notification of an incoming message may be undesirable. Thus, one or more of the notification techniques may be delayed, suppressed, or canceled, for a period of time or indefinitely, while the media file and/or application is executing. An application may also provide the capability to output certain types of notifications during execution. In one example, a media player executing a media file provides the capability to output a high priority notification to the display device, or a portion of the display device. In another example, an executing gaming application can output a notification that is relevant to the gaming experience (e.g., a message on a social network from a game buddy) to the display device, or a portion of the display device.

In this embodiment, when an electronic communication is received during media playback, the notifications manager is informed that an application is occupying certain system resources associated with one or more output mechanisms. Occupying certain system resources associated with one or more output mechanisms may include executing media files, tasks, and the like. The notifications manager queries the application to determine if the application may be interrupted to output the notification. In this embodiment, the application judges whether interruption is appropriate. In alternative embodiments, an executing application can supply the notifications manager with information and the notifications manager can judge whether interruption is appropriate. Additionally, embodiments are envisioned where the notifications manager interrupts the application without regard to whether interruption is determined to be appropriate—often when an electronic communication is highly urgent.

An application executing a media file or other task of known duration, e.g., a song having a play length of five minutes, may calculate the amount of time remaining until completion of the media file and compare the calculated time remaining to a threshold (e.g., interruption threshold) to determine if interruption is appropriate. The user, the application, and/or the notifications manager may set or adjust the threshold. For example, it may be undesirable to interrupt the climax of a movie, e.g., the last 10 minutes. In this case, when the application determines the calculated time remaining is within the last 10 minutes of the movie, it responds to the notifications manager that interruption of the audio and video output mechanisms is not appropriate. Furthermore, the application may indicate that interruption by any output mechanism is not appropriate.

An application using the resources of one or more output mechanisms for an unknown duration or executing a task of unknown duration, e.g., a telephony application supporting a telephone call, may estimate the amount of time remaining until the output mechanism is available and compare the estimated time remaining to a threshold to determine if interruption is appropriate. For example, when the mobile communications device receives a new, incoming electronic communication during a telephone call, the telephony application requires the device's audio output. In this situation, the telephony application estimates the amount of time remaining for the telephone call. Estimating the time remaining may include analyzing a call/message log locally stored on the mobile communication device and/or analyzing a call/message log stored on a remote server by a service provider. An estimate of the time remaining may be calculated based on an average duration and/or some other function of past calls between the specific parties.

In this embodiment, the notifications manager and/or an application being queried can consider the number of times the application has already been interrupted when determining whether interruption is appropriate. For example, an application can maintain a count of the number of time it has been interrupted. If the count exceeds a threshold—indicating the maximum number of times the application may be interrupted—the notification manager and/or application will determine that interruption is inappropriate.

In some embodiments, the mobile communications device includes one or more sensors that can detect aspects of the operating environment of the device. In these embodiments, the notifications manager may consider these aspects when determining how and when to output notification of an incoming electronic communication. In some instances, an application considers output from one or more sensors when determining an interruption threshold. For example, the mobile communications device may include a light sensor supplying information regarding the brightness of the device's environment. A dark operating environment may indicate that the user is relaxing, e.g., watching a movie, and does not want to be interrupted. Thus, in this case, the dark environment may increase the threshold. As another example, the mobile communications device includes a sensor that detects when the device is in motion, e.g., an accelerometer. Significant and consistent movement of the device may indicate that the user is jogging. This information may be considered along with, for example, an athletics log (indicating average duration of the user's workouts) to adjust or set the threshold. These and other aspects are considered in more detail below.

Figure 2:
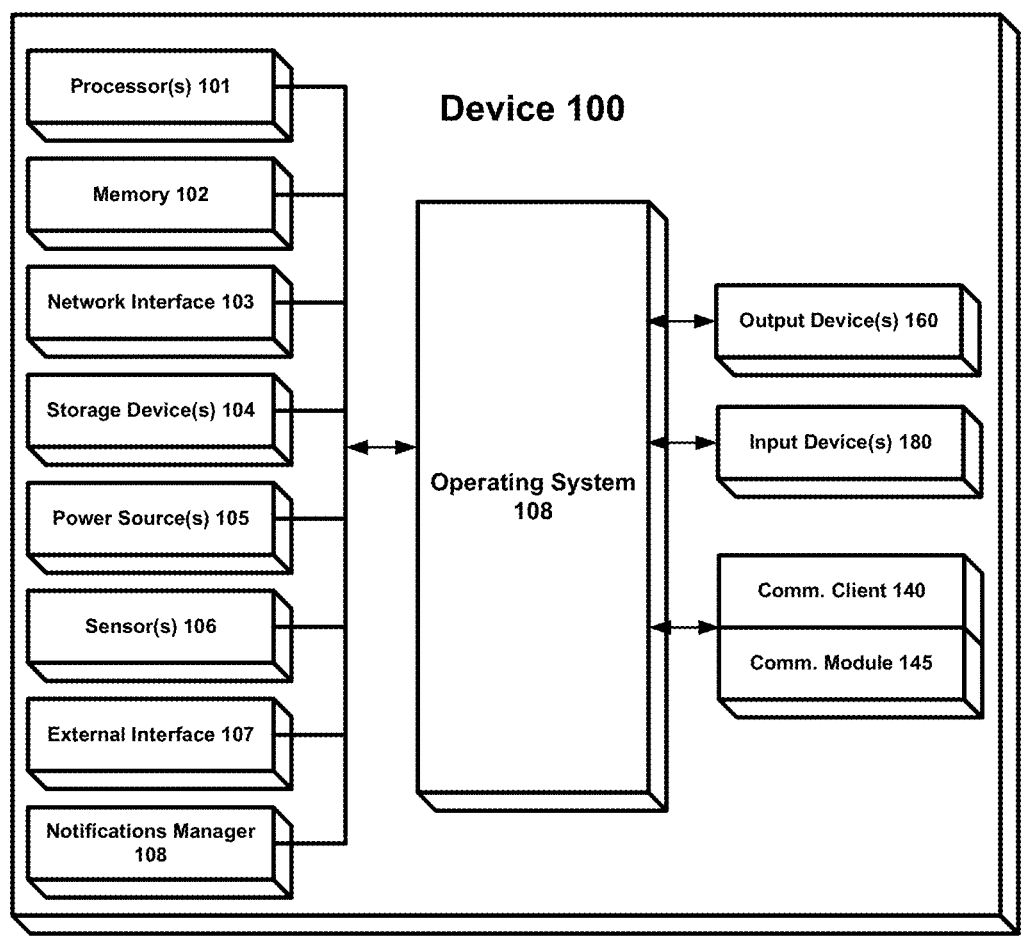
FIG. 2 is a block diagram of basic functional components for one of the electronic devices in FIG. 1.

An example communications environment is described in detail with respect to FIGS. 1-2. The illustrated environment is presented as an example, and does not imply any limitation regarding the use of other networking environments. To the contrary, the description contemplates all implementations of communications environments that support delaying notifications in an electronic device based on the importance or urgency of the notification, the application or media that the electronic device is currently executing, and/or the operating environment of the electronic device.

Turning to FIG. 1, example electronic devices 100A and B are connected to a communications environment that enables one or more communications sessions among the electronic devices 100A and B. In some embodiments, the communications environment supports multimedia communications. Example electronic devices 100A and B include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers. In some embodiments, two or more electronic devices may be connected in the same manner to a communications session. Similarly, electronic devices 100A and B may include similar communications mechanisms. For example, electronic device 100A and electronic device 100B may both be mobile telephones. In other embodiments, two or more electronic devices 100A and B are different types of devices. For example, electronic device 100A may be a mobile telephone and electronic device 100B may be a desktop computer or other device residing on and powered by programmed logic circuits. In this way, various electronic devices supporting diverse functionality can interact within a communications environment.

In the embodiment illustrated by FIG. 1, the electronic device 100A communicates with server 300, cellular network 360, and/or any other communications host via a communications channel 200A. The communications channel typically includes an Internet connection or a mobile communication connection but could be established by other such communications circuits such closed networks, etc. The server 300 often comprises multiple physical servers such as a communications server 320 for maintaining or "hosting" one or more communications sessions. Of course, each server can be a physically separate machine or it can be different processes running within the same physical machine. In some embodiments the server 300 includes a plurality of interconnected devices maintained at different physical locations. The cellular network 360 often comprises multiple cellular towers, with related hardware and software, located a separate physical locations. In this embodiment, the server 300 and cellular network 360 are maintained by one or more service providers in order to facilitate communication and interaction among individuals, e.g., users of the electronic devices 100A and B. In some embodiments, the server 300 and the cellular network 360 communicate over a communications channel and may be interconnected components of the same communications environment.

In one example embodiment, one or more service providers maintain or host a communications session. In another example embodiment, the electronic device 100A maintains or hosts a communications session and other electronic devices—such as the electronic device 100B in FIG. 1—are routed to the communications session at the electronic device 100A by the server 300, cellular network 360, or the like.

The electronic device 100 of FIG. 1 includes application(s) 120, communications client 140, output device 160 (e.g., a display), and input device 180 (e.g., keyboard, mouse, touch screen). Application(s) 120 provide the electronic device 100 with a variety of functionality. Generally, application(s) 120 employ the output device 160 to display information at a graphical user interface (GUI) 165 and the input device 180 to accept and respond to user input. The application(s) 120 may include, but are not limited to, an email client, an instant messaging client, a text messaging client, a video conferencing client (e.g., Google+ Hangouts), an Internet browser, games, word processors, presentation software, media players, calendars, and/or the like. In some embodiments, the notifications manager 108 of FIG. 2 is an application 120. Application(s) 120 may execute media files, tasks, and the like.

The communications client 140 further includes a communications module 145 that enables output device 160 to display information at the GUI 165. The communications module 145 also enables the communications client 140 to connect to the communications server 320 and/or cellular network 360, allowing a user of the electronic device 100 in FIG. 1 to establish/join a communications session and transmit/receive communications. The communications module 145 may be a network module that connects the electronic device 100 to a network such as the Internet using network protocol techniques including, by way of example, transmission control protocols and Internet protocols. In this manner multiple electronic devices 100A and B may join the same communications session 340 hosted at the communications server 320. Through the communications session 340, the communications module 145 at the electronic device 100 enables the user to reside in a location where other electronic devices may join the session.

Once a communications session 340 is established, a session channel, e.g., channel 200A, between the communications client 140 and the communications server 320 and/or the cellular network 360 exchanges data, such as audio, video, text, and/or other information. In some embodiments, the data exchanged between the communications client 140 and the communications server 320 is optimized based, at least in part, on the hardware and/or software capabilities of electronic device 100. For example, if the electronic device 100 is a mobile device connecting to the communications session 340 by way of a bandwidth limited path such as a cellular network, communications server 320 may optimize the number and quality of the audio, video, text, and/or other information sent to the electronic device 100. Furthermore, the communications client 140 may dynamically adjust the bit rate required to send the information to the communications server 320 by, for example, reducing the quality of the audio, video, text, and/or other information being sent to the communications server 320.

GUI 165 is an illustrative example of a GUI from which a communications session may be initiated and sustained. In the illustrated embodiment, GUI 165 includes information about one or more other electronic devices connected to the electronic device 100 by the communications session 340. The GUI may also include notifications of events and other information relevant to the user of the electronic device 100.

Referring now to FIG. 2, one example of the electronic device 100 is illustrated. In general, many other embodiments of the electronic device 100 may be used as long as they support at least limited participation in a communications sessions. In the example embodiment of FIG. 2, the electronic device 100 includes one or more processors 101, memory 102, network interface 103, one or more storage devices 104, power source 105, one or more sensors 106, external interface 107, notifications manager 108, output device 160, and input device 180. The electronic device 100 also includes an operating system 109 and a communications client 140 that are executable by the electronic device 100. In a conventional fashion, each of components 101-109, 140, 160, and 180 are interconnected physically, communicatively, and/or operatively for inter-component communications.

As illustrated, the processor(s) 101 are configured to implement functionality and/or process instructions for execution within the electronic device 100. For example, the processor(s) 101 execute instructions stored in the memory 102 or instructions stored on the storage devices 104. The memory 102, which may be a non-transient, computer-readable storage medium, is configured to store information within electronic device 100 during operation. In some embodiments, the memory 102 includes a temporary memory, area for information not to be maintained when the electronic device 100 is turned off. Examples of such temporary memory include volatile memories such as random access memories (RAM), dynamic random access memories (DRAM), and static random access memories (SRAM). The memory 102 is maintains program instructions for execution by the processor(s) 101. In some embodiments the notifications manager 108, and/or the operating system 109, and/or the application(s) 120 are implemented as computer readable instructions or program code embodied within the memory 102.

The storage device(s) 104 also include one or more non-transient computer-readable storage media. The storage device(s) 104 are generally configured to store larger amounts of information than the memory 102. The storage device(s) 104 may further be configured for long-term storage of information. In some examples, the storage device (s) 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories. In some embodiments the notifications manager 108, and/or the operating system 109, and/or the application(s) 120 are implemented as computer readable instructions or program code embodied within the storage device 104.

The electronic device 100 uses the network interface 103 to communicate with external devices via one or more networks, such as one or more wireless networks. The network interface 103 may be a network interface card, such as an Ethernet card, an optical transceiver, a radio frequency transceiver, or any other type of device that can send and receive information. Other non-limiting examples of network interfaces include Bluetooth®, 3G, 4G, and WiFi® radios in mobile computing devices, and universal serial bus (USB). In some embodiments, the electronic device 100 uses the network interface 103 to wirelessly communicate with an external device such as the server 300 and/or cellular network 360 of FIG. 1, a mobile phone, or other networked computing device.

The electronic device 100 includes one or more input devices 180. The input device 180 is configured to receive input from a user through tactile, audio, and/or video feedback. Non-limiting examples of the input device 180 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 160 are also included in electronic device 100. The output device 160 is configured to provide output to a user using tactile, audio, and/or video stimuli. The output device 160 may include a display screen (part of the presence-sensitive screen), a sound card, a video graphics adapter card, or any other type of device for converting a signal into an appropriate form understandable to humans or machines. Additional examples of the output device 160 include a speaker, a cathode ray tube (CRT) monitor, a liquid crystal display (LCD), or any other type of device that can generate intelligible output to a user.

The electronic device 100 includes one or more power sources 105 to provide power to the device. Examples of the power source 105 include single-use power sources, rechargeable power sources, and/or power sources developed from nickel-cadmium, lithium-ion, or other suitable material.

The electronic device 100 includes one or more sensors 106 to detect an operating environment of the electronic device 100. Examples of sensors 106 include, but are not limited to, light sensors, motion sensors, location sensors (e.g., global positioning system receiver), orientation sensors, aural sensors, pressure sensors, presence sensors, and temperature sensors.

The electronic device 100 includes one or more external interface 107 for physical connection to another electronic device. Examples of external interface 107 include an interface for connection to a dock, any type of wired connection, any type of power connection, and the like.

The electronic device 100 includes a notifications manager 108. The notifications manager 108 can intelligently and automatically select one or more mechanisms for outputting a notification indicating an incoming electronic communication based on the urgency of the communication, an application and/or media executing on the electronic device 100, and/or the operating environment of the electronic device (as determined, e.g., by sensors 106). Further, the notifications manager 108 can delay the output of notifications which would otherwise be output in real-time, i.e., without intentional delay after reception of an incoming electronic communication. Thus, when the electronic device 100 of this embodiment receives an incoming electronic communication, such as an incoming text message, the notifications manager 108 determines the appropriate mechanism(s) and timing for outputting the notification to output device 160. The notifications manager 108 may be implemented as a hardware component, a software component, or any combination thereof.

The electronic device 100 includes an operating system 109 such as the Android® operating system. The operating system 109 controls operations of the components of the electronic device 100. For example, the operating system 109 facilitates the interaction of the communications client 140 with the processor(s) 101, memory 102, network interface 103, storage device(s) 104, notifications manager 108, input device 180, output device 160, and the power source 105. As illustrated in FIG. 2, the communications client 140 includes the communications module 145. Each of the communications client 140 and the communications module 145 typically includes program instructions and/or data that are executable by the electronic device 100. For example, in one example embodiment communications module 145 includes instructions causing the communications client 140 executing on the electronic device 100 to perform one or more of the operations and actions described in the present disclosure.

In some example embodiments, the communications client 140, communications module 145, and/or notifications manager 108 form a part of operating system 109 executing on the electronic device 100. In other embodiments, the communications client 140 receives input from one or more of the input devices 180 of the electronic device 100. The communications client 140 preferably receives audio and video information associated with a communications session 340 from other electronic devices participating in the communications session. In some instances the communications client 140 and/or communications module 145 may include an email client, an instant messaging client, a text messaging client, a video conferencing client (e.g., Google+Hangouts), an Internet browser, and/or the like. In some instances the communications client 140 and/or communications module 145 transmit information of incoming electronic communications to the notifications manager 108. In some embodiments the notifications manager 108, and/or the operating system 109, and/or the application(s) 120 are implemented as computer readable instructions or program code embodied within one or more non-transient computer readable storage mediums.

Figure 3:
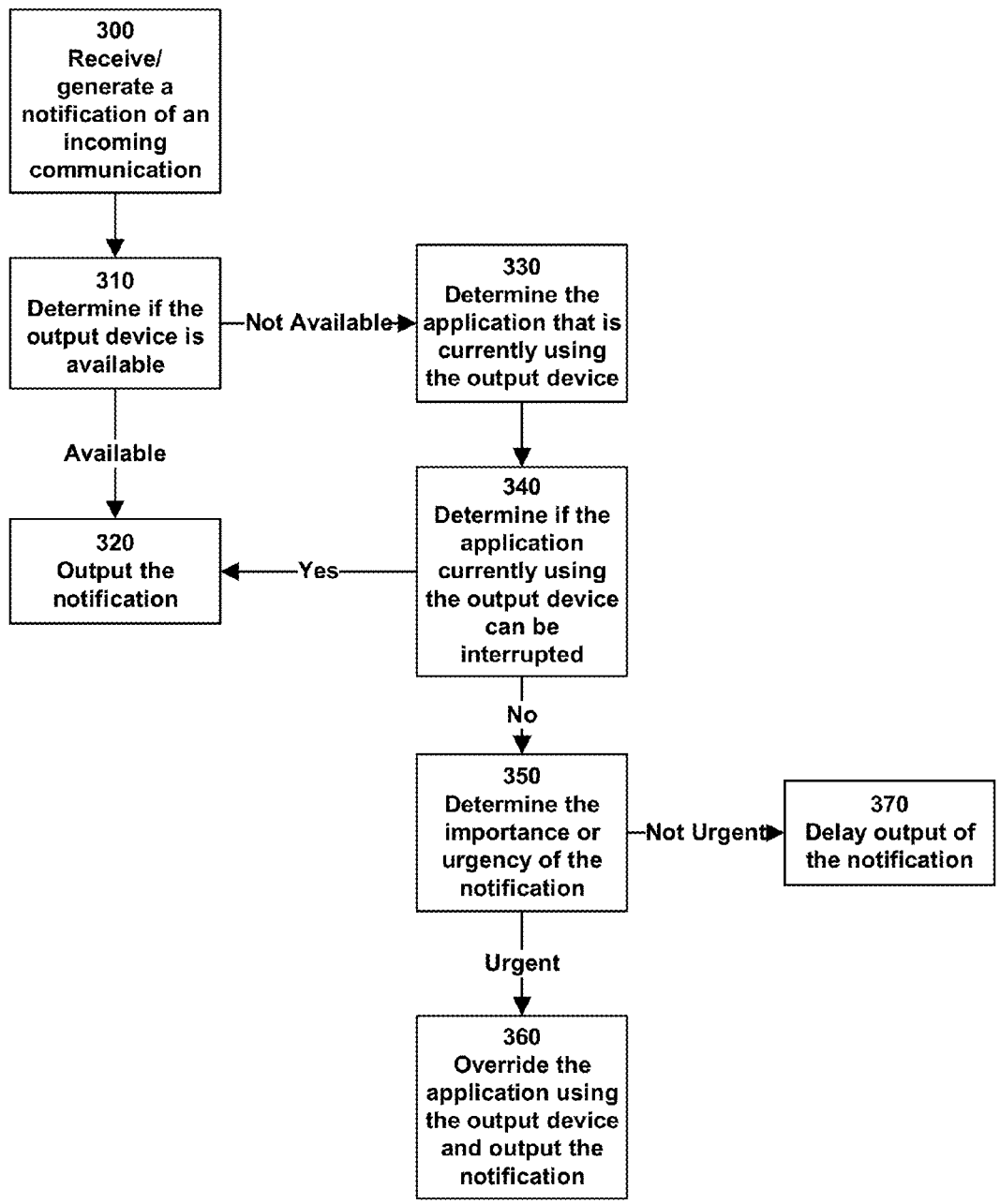
FIG. 3 is a flow diagram illustrating an example method for delaying notifications in an electronic device based on the importance or urgency of the notification, and the application or media that the electronic device is currently executing.

Turning now to FIG. 3, an example process for delaying a notification in an electronic device based on the importance or urgency of the notification and the application or media, if any, executing on the mobile device. The disclosure that follows describes the process of FIG. 3 executing on the example system and components illustrated in FIGS. 1-2. However, the process of FIG. 3 is not limited to the system and components of FIGS. 1-2, and may execute on any appropriately configured electronic device.

Step 300: Receive/generate a notification of an incoming communication. The process begins at step 300 when notification of a new, incoming electronic communication is received or generated. In the example embodiment described in accordance with FIGS. 1-2, electronic communications, which may include notifications, are received by the network interface 103 of the electronic device 100. Example electronic communications include, but are not limited to, text messages (e.g., SMS, MMS), telephone calls, push notifications from a server, etc. The network interface 103 transfers notifications to the notifications manager 108. The notifications manager 108 may continuously operate in the background of the electronic device 100 to detect and handle notifications. In some embodiments, the electronic device 100 receives an incoming communication or a request to establish communications and generates a notification, which is subsequently passed to the notifications manager.

Step 310: Determine if the output device is available. After receiving the notification in step 300, the process of FIG. 3 advances to step 310 where the system determines if the output device, i.e., the system resources required to operate the output device, is available to output the notification. Step 310 may be accomplished by the notifications manager 108 sending a request to the operating system 109 to determine if the system resources required to operate the output device 160 are available. In response, the operating system 109 may identify the system resources that are available and the system resources that are being used. For example, the operating system 109 can analyze system resources associated with the audio output, the visual output, and the tactile output to determine if they are available, or whether these resources are assigned to or being used by an application 120.

Step 320: Output the notification. If the system determines that the output device is available at step 310, the process of FIG. 3 advances to step 320. The operating system 109, which received the query from the notifications manager 108 and analyzed the system resources in step 310, indicates that the output device 160 is available. The notifications manager 108 takes control of the system resources, either directly or via the operating system 109, and outputs the notification. As described throughout the disclosure, notification methods may be aural, and/or visual, and/or tactile. In some embodiments, two or more of the enumerated notification methods may be used in combination. For example, outputting the notification may include outputting an audio notification and a visual notification to the output device 160 of FIG. 1. In another example, output of the notification may additionally include outputting a tactile notification, e.g., a vibration.

Step 330: Determine the application that is currently using the output device. In the situation where the system determines that the output device is not available—i.e., is currently being used by an application, such as a media player—at step 310, the process of FIG. 3 advances to step 330. At step 330, the system, e.g., the operating system 109, identifies and reports the application 120 that is currently using the system resources required to operate the output device to the notifications manager 108.

Figure 4:
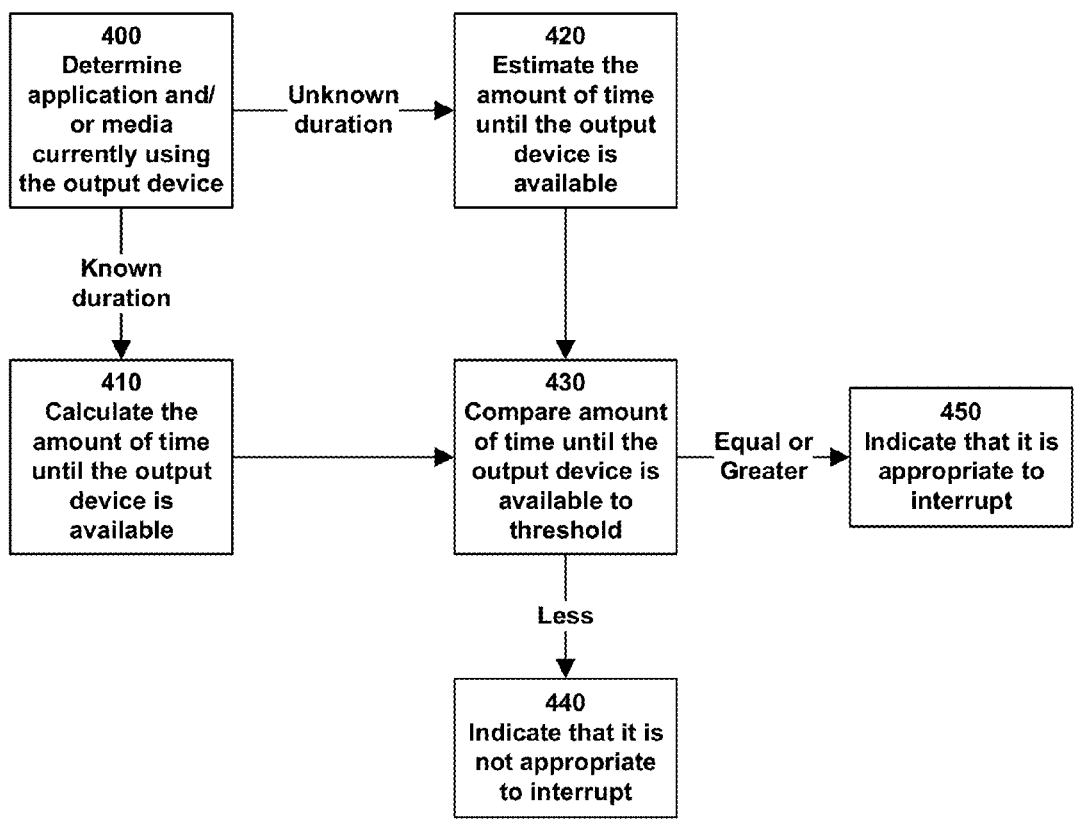
FIG. 4 is a flow diagram illustrating an example method for determining whether an application controlling an output device can be interrupted.

Step 340: Determine if the application currently using the output device can be interrupted. Once the application 120 that is using the system resources required to output the notification has been identified by the operating system 109 at step 330, the notifications manager 108 queries the application to determine if the application 120 can be interrupted and cede control of the output device. In response, the application 120 determines whether it can be interrupted and responds to the notifications manager 108. FIG. 4 illustrates an example process for determining whether an application 120 can be interrupted and cede control of the output device.

Step 350: Determine the importance or urgency of the notification. When the application 120 indicates that interruption is not appropriate at the current time in step 340, the process of FIG. 3 proceeds to step 350. Upon receiving the application's response, the notifications manager 108 determines the urgency of the notification. Techniques for determining the urgency of a notification and/or electronic communication have been previously described.

Step 360: Override the application using the output device and output the notification. When the notifications manager 108 determines that the notification is important or highly urgent, e.g., an emergency situation, in step 350, the process of FIG. 3 proceeds to step 360. The notifications manager 108 overrides the application's 120 decision not to interrupt and seizes control of the output device 160. Then, as in step 320, the notifications manager 108 outputs the notification.

Step 370: Delay output of the notification. When the notifications manager 108 determines that the notification is not urgent, e.g., the notification is associated with an advertisement, in step 350, the process of FIG. 3 proceeds to step 370. Here, the notifications manager 108 delays output of the notification by an amount of time determined or estimated by the application 120 in step 340 (detailed in FIG. 4). In some embodiments, each method of outputting the notification—aural, visual, and tactile—is delayed by the notifications manager for a certain time period. In another embodiment, at least one notification method is delayed while at least one other notification method proceeds to output the notification in real-time. For example, aural output of the notification may be delayed while visual output of the notification may proceed in real time.

Turning next to FIG. 4, an example process is illustrated for determining whether an application 120 can be interrupted and cede control of the output device.

Step 400: Determine application and/or media currently using the output device. As described above, when an electronic communication is received while an application and/or media is using the output device 160, the notifications manager 108 is informed that an application 120 is occupying certain system resources associated with one or more output mechanisms (e.g., output device 160). In some embodiments, the system, e.g., the operating system 109, identifies and reports the application 120 and/or media that is currently using the output device 160 to the notifications manager 108. In some situations, the application 120 is executing a media file of known duration and the process proceeds to step 410. In other situations, the application 120 is using the output device 160 for an unknown duration and the process proceeds to step 420.

Step 410: Calculate the amount of time until the output device is available. When the application 120 is executing a media file of known duration, the application calculates the amount of time remaining until completion of the media file. This may be accomplished using known techniques.

Step 420: Estimate the amount of time until the output device is available. When the application 120 is using the output device 160 for an unknown duration, the application 120 estimates the amount of time remaining until the output device 160 is available. Estimating the time remaining may include analyzing a call/message log locally stored on the electronic device (e.g., in storage device 104) and/or analyzing a call/message log stored on a remote server by a service provider. An estimate of the time remaining may be calculated based on an average duration and/or some other function of past calls between the specific parties. The current time, day of the week, established relationship between the parties, operating environment of the electronic device, etc. may be considered when estimating the time remaining. For example, a call log may indicate that party A generally does not have conversations exceeding five minutes after 9 PM. This information can be used to estimate the time remaining for a telephone call involving party A after 9 PM.

Step 430: Compare the amount of time until the output device is available to threshold. The calculated (step 410) or estimated (step 420) amount of time remaining is then compared to a threshold to determine if interruption is appropriate. The user, the application, and/or the notifications manager may set or adjust the threshold. The threshold may also be set or adjusted based on the operating environment—for example, as sensed by sensors 106—of the electronic device.

Step 440: Indicate that it is inappropriate to interrupt. In situations where he calculated (step 410) or estimated (step 420) amount of time is less than the threshold, the application 120 responds to the notifications manager 108 that interruption is not appropriate.

Step 450: Indicate that it is appropriate to interrupt. In situations where the calculated (step 410) or estimated (step 420) amount of time is equal to or greater than the threshold, the application 120 responds to the notifications manager 108 that interruption is appropriate. Alternatively, situations where the calculated (step 410) or estimated (step 420) amount of time is equal to the threshold, the application 120 may respond to the notifications manager 108 that interruption is not appropriate.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
   receiving, by a notifications manager executing at an electronic device, a notification of an incoming electronic communication;
   determining, by the notifications manager, that an output device of the electronic device is currently being used by an application actively executing at the electronic device;
   identifying, by the notifications manager, the application actively using the output device;
   determining, by the notifications manager based at least in part on the identity of the application, an estimated duration of time until the application will cease using the output device;
   determining, by the notifications manager based at least in part on the estimated duration of time until the application will cease using the output device, whether the application can be interrupted; and
   responsive to determining that the application cannot be interrupted:
      determining, by the notifications manager, an urgency of the notification;
      responsive to determining that the notification is urgent:
         interrupting, by the notifications manager, execution of the application before the estimated duration of time has elapsed; and
         outputting, by the notifications manager and to the output device, the notification; and
      responsive to determining that the notification is not urgent, delaying, by the notifications manager, output of the notification until the estimated duration of time has elapsed.

2. The method of claim 1, further comprising:
   outputting, by the output device of the electronic device, at least one of an aural output, visual output, or tactile output of the notification.

3. The method of claim 1, wherein delaying output of the notification comprises:
   delaying aural output of the notification; and
   outputting, by the output device, one of visual output or tactile output of the notification in real-time.

4. The method of claim 1, wherein determining whether the application can be interrupted comprises:
   comparing, by the notifications manager, the estimated duration of time to a threshold;
   responsive to determining that the estimated duration of time is no more than the threshold, determining, by the notifications manager, that the application cannot be interrupted; and
   responsive to determining that the estimated duration of time is greater than the threshold determining, by the notifications manager, that the application can be interrupted.

5. The method of claim 4, wherein the threshold is determined by at least one of a variable setting of the electronic device, the application, or an operating environment of the electronic device.

6. The method of claim 1, further comprising:
   outputting, by the output device, at least two of aural output, visual output, and tactile output.

7. The method of claim 1, wherein determining the estimated duration of time until the application will cease using the output device comprises:
   determining, by the notifications manager, whether the application is executing media of a finite duration;
   responsive to determining that the application is executing media of the finite duration:
      calculating, by the notifications manager, an amount of time remaining until the media completes execution; and
      determining, by the notifications manager, that the estimated duration of time is the amount of time remaining; and
   responsive to determining that the application is not executing media of the finite duration:
      estimating, by the notifications manager, an amount of time the application will use the output device; and
      determining, by the notifications manager, that the estimated duration of time is the estimated amount of time.

8. The method of claim 7, wherein estimating the amount of time the application will use the output device comprises analyzing, by the notifications manager, historical data of the application.

9. The method of claim 8, wherein:
   the application is a telephony application, and
   analyzing historical data of the telephony application includes analyzing a call log that includes respective durations of previous communications.

10. An electronic device comprising:
    a transceiver configured to receive a notification of an incoming electronic communication;
    an output device configured to output aural, visual, or tactile output;
    a computer-readable storage device configured to store an application and a notifications manager;
    at least one processor configured to execute the application and the notifications manager, wherein the application is currently executing and using the output device, and wherein the at least one processor executes the notifications manager to:
       determine that the output device is currently being used by the application;
       determine an identity of the application;
       determine, based on the identity of the application, an estimated duration of time until the application will cease using the output device;
       determine, based at least in part on the estimated duration of time until the application will cease using the output device, whether the application can be interrupted;
       responsive to determining that the application cannot be interrupted:
          determine an urgency of the notification;
          responsive to determining that the notification is urgent:
             interrupt execution of the application before the estimated duration of time has elapsed; and
             output, to the output device, the notification; and
          responsive to determining that the notification is not urgent, delay output of the notification until the estimated duration of time has elapsed.

11. The electronic device of claim 10, wherein the at least one processor executes the notifications manager to determine the estimated duration of time by at least executing the notifications manager to:

responsive to determining that the application is executing media of a finite duration:
  calculate an amount of time remaining until the media completes execution; and
  determine that the estimated duration of time is the amount of time remaining; and
responsive to determining that the application is not executing media of a finite duration:
  estimate an amount of time the application will use the output device; and
  determine that the estimated duration of time is the estimated amount of time.

12. The electronic device of claim 11, wherein the at least one processor executes the notifications manager to estimate the amount of time the application will use the output device by at least executing the notifications manager to analyze historical data of the application.

13. The electronic device of claim 12, wherein the computer-readable storage device is configured to store the historical data of the application.

14. The electronic device of claim 10, further comprising:
at least one sensor configured to sense an operating environment of the electronic device,
wherein the at least one processor executes the notifications manager to determine whether the application can be interrupted by at least executing the notifications manager to: compare the estimated duration of time to a threshold, wherein the threshold is adjusted based at least on part on the operating environment sensed by the at least one sensor.

15. A computer-readable storage device encoded with instructions that, when executed, cause one or more processors of an electronic device to:
receive a notification of an incoming electronic communication;
determine that an output device of the electronic device is currently being used by an application actively executing at the electronic device;
determine an identity of the application;
determine, based at least in part on the identity of the application, an estimated duration of time until the application will cease using the output device;
determine, based at least in part on the estimated duration of time until the application will cease using the output device, whether the application can be interrupted;
responsive to determining that the application cannot be interrupted:
  determine an urgency of the notification;
  responsive to determining that the notification is urgent:
    interrupt execution of the application before the estimated duration of time has elapsed; and
    output, to the output device, the notification; and
  responsive to determining that the notification is not urgent, delay output of the notification until the estimated duration of time has elapsed.

16. The computer-readable storage device of claim 15, wherein the instructions cause the one or more processors to determine whether the application can be interrupted by at least causing the one or more processors to:
compare the estimated duration of time to a threshold;
responsive to determining that the estimated duration of time is no more than the threshold, determine that the application cannot be interrupted; and
responsive to determining that the estimated duration of time is greater than the threshold determine that the application can be interrupted.

17. The computer-readable storage device of claim 16, wherein instructions cause the one or more processors to estimate the amount of time the application will use the output device by at least causing the one or more processors to:
analyze a call log of the application, wherein the application is a telephony application, and wherein the call log includes respective durations of previous communications.

18. The computer-readable storage device of claim 15, wherein the instructions cause the one or more processors to determine the estimated duration of time until the application will cease using the output device by at least causing the one or more processors to:
responsive to determining that the application is executing media of a finite duration:
  calculate an amount time remaining until the media completes execution; and
  determine that the estimated duration of time is the amount of time remaining; and
responsive to determining that the application is not executing media of a finite duration:
  estimate an amount of time the application will use the output device; and
  determine that the estimated duration of time is the estimated amount of time.

* * * * *